March 29, 1932. B. W. FREEMAN 1,851,667
SHOE ORNAMENTING DEVICE
Filed Nov. 22, 1927 2 Sheets-Sheet 2
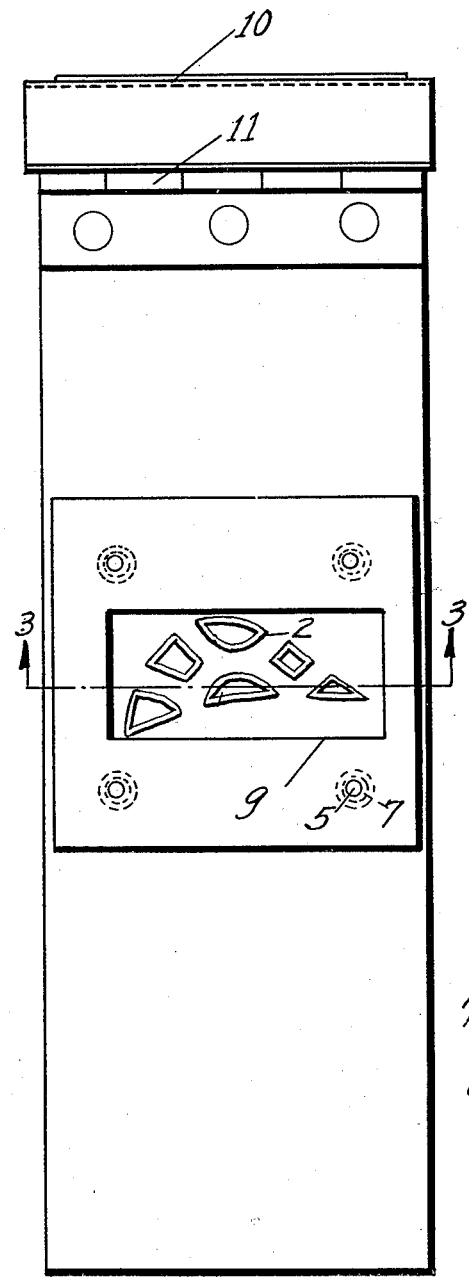
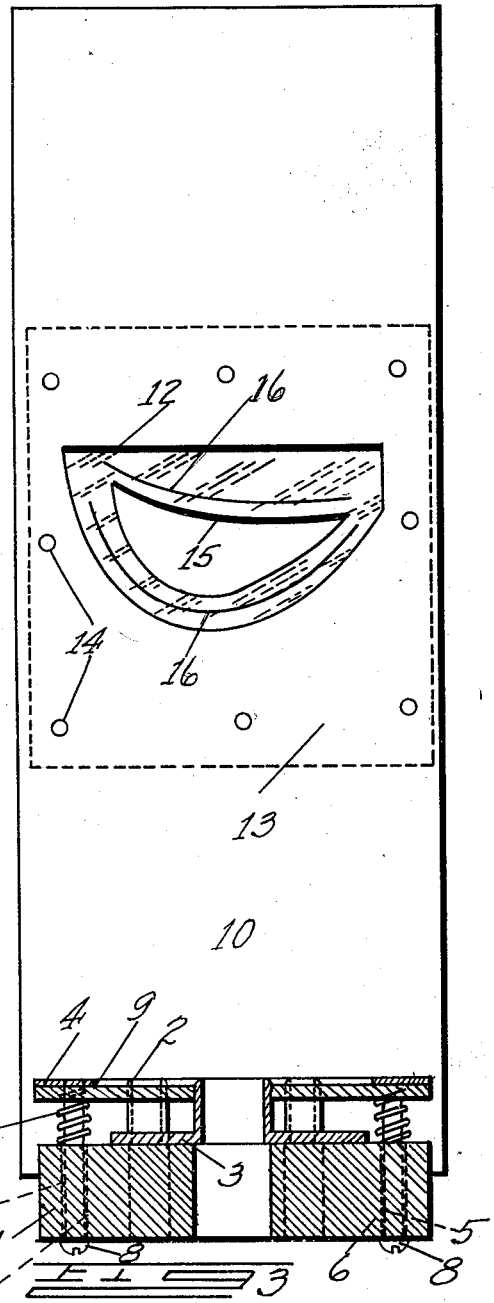

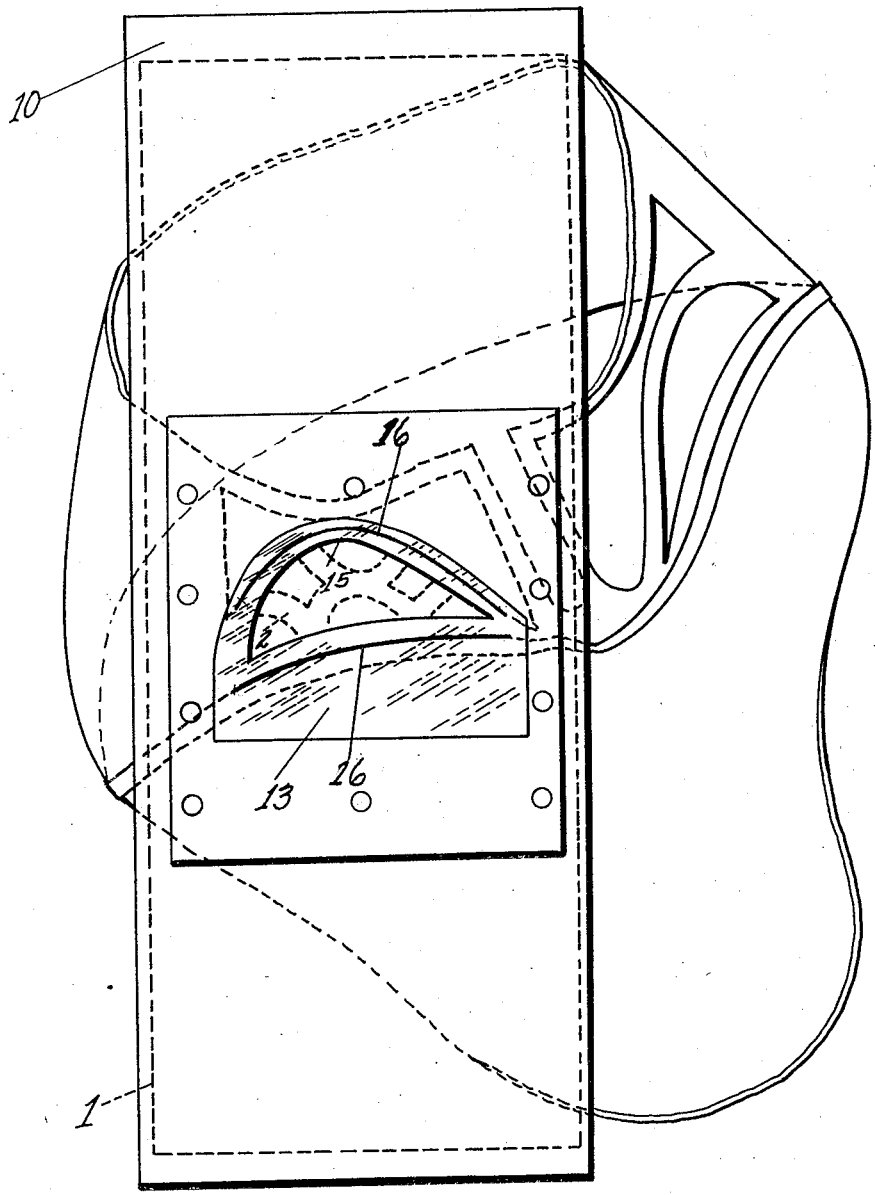

Patented Mar. 29, 1932

1,851,667

UNITED STATES PATENT OFFICE

BENJAMIN W. FREEMAN, OF CINCINNATI, OHIO

SHOE ORNAMENTING DEVICE

Application filed November 22, 1927. Serial No. 235,099.

My invention relates broadly to shoe ornamenting devices, and particularly to a novel type of device for positioning or holding work in conjunction with shoe ornamenting instrumentalities, which preferably combines the functions of both positioning and holding.

In cut-out, perforating, or other ornamenting machines for doing the open or decorative work on shoes, there has been considerable development in the provision of work supports on which shoe parts to be ornamented may be placed, which will enable an operator to ornament the shoe part after it has been closed or fitted. In one type of cut-out machine, with which I am particularly familiar, a movable work support consisting of an anvil type base having a die support on which the ornamenting dies are mounted, with a stripper plate through which the dies are forced into engagement with the work by a movable presser plate, is provided. In order to hold the work there is provided what has been called a mask, which has cut-out portions which will permit the work to be positioned or aligned in proper relation to the ornamenting instrumentalities. The mask has cut-out portions, the edges of which may be used to assist in the alignment of the shoe part in the machine. In the specific cut-out machine to which I have referred, the mask is articulated to the base, so that the shoe part may be positioned with the mask swung back from the base. The mask may then be swung down over the work so that it will hold it down during the ornamenting operation. The mask may further be used for positioning, aligning and gauging the work.

My invention has as one of its objects the provision of an improved type of mask, using the term mask in its broadest significance. Specifically I will describe herein a mask having cut-out portions through which the work may be readily observed. The outer edges of the cut-out portions or other predetermined parts of the mask may be used for aligning and positioning the work. I have increased the field of usefulness of the mask, however, by securing to the mask a sheet of material which is cut out to form a pattern, the outer edge or other selected portions of which may be used for positioning, gauging, or aligning the work with reference to the ornamenting dies. The material will preferably be transparent and also have the property of not injuring the ornamenting devices when contacting therewith. When a metal plate having cut-out portions is used as a mask the edges of the cut-out portions cannot be located immediately adjacent the ornamenting devices, for should they contact the ornamenting devices would be injured or the work may be distorted and poorly ornamented. Where a field surrounds or partially surrounds the cut-out portion it is of great assistance in permitting the operator of the machine to accurately and quickly locate or position the work. Further, any type of mark, pattern or design may be formed on the transparent field to assist in the positioning of the work. The material may be celluloid or some semi-rigid material which is also useful in holding the work.

The invention is also applicable to perforating, marking and other types of ornamenting machines or devices. For example, in a perforating machine the use of transparent material or material which will be non-injurious to the dies may be combined or used as a solid gauge to assist in the positioning or holding of work. Such material may also be combined with the well known type of pin gauge. The work may be marked or pricked and the positioning or holding device may be used in conjunction therewith, to definitely locate the work with respect to the ornamenting dies.

The above and other objects to which reference will be made in the ensuing disclosure I accomplish by that certain combination and arrangement of parts of which I have shown a preferred embodiment.

Referring to the drawings:—

Figure 1 is a plan view of the work supporting assembly showing one position in which a portion of an upper to be ornamented may be held.

Figure 2 is a plan view of the work supporting assembly with the mask elevated at right angles to the support.

Figure 3 is a sectional view taken along the lines 3—3 in Figure 2.

I have indicated at 1 the ornamenting die base which as shown may be a metal plate adapted for use either with an anvil or other support. The dies 2 may either be mounted directly on the base, or they may be secured to a plate 3 which is screwed to the base plate 1. A stripper plate 4 having pins 5 extending from its under surface is mounted in holes 6 in the base 1. Springs 7 are mounted coaxially on the pins 5 to press upwardly on the stripper plate, while the heads 8 of the pins limit the upward movement and prevent the stripper plate from becoming detached from the base. The stripper plate has a cut-out portion outlined by the line 9 which allows clearance so that the dies may be forced up into engagement with the work by the downward movement of the pressure platen. Hinged to the base 1 I have shown the mask 10 having hinges 11. The mask has a cut-out portion 12 of greater area than the pattern to be ornamented and extending across the cut-out portion 12 there is a sheet of celluloid 13 which is shown as attached to the mask with rivets 14. A pattern, the outer edges of which are indicated at 15, is cut in the celluloid sheet so that when a shoe element is placed on the work support the operator can roughly position the work by means of the cut-out portion of the mask, and then accurately align and position the work with reference to the outer edge of the cut-out portion of the celluloid sheet. I have shown the lines 16 spaced from the edges 15. Such lines may be painted, stamped, or marked on the transparent plate, and they may be used as gauges to register with certain contoured portions of the shoe part, thus assisting in the positioning of the part independently of the edges 15. Various types and arrangements of patterns, prick points, or the like when applied to shoe parts may be used to register with corresponding marks on the plate to properly locate the work. While I have shown a transparent sheet as permanently attached to the mask, it may be mounted thereon in other desired ways.

The essential feature of the invention is primarily the use of material which will not damage the ornamenting devices, and thus can be used immediately adjacent the ornamenting devices. As noted, the material will preferably be transparent. While the mask or hold down plate is shown as hinged to the base 1, I do not wish to be limited to this specific type of hold down or positioning device.

Having thus described my invention, what I claim as new and desire to secure by Letters Patent, is:—

1. A combination for use in a shoe ornamenting machine comprising a die block, a plate for holding work mounted on said block, said plate having transparent portions through which work thereunder may be observed, said transparent portions being cut-out to permit the passage of an ornamenting die therethrough.

2. In combination a mask for holding work, a die block to which said mask is connected, said mask having cut-out portions therein, and a transparent member extending within said cutout portions also having cut out portions, the edges of which are shaped to act as a gauge to assist in the positioning of work.

3. In combination, a die block, a mask for holding work associated with said block, said mask having cut-out portions therein, a transparent member also having cut-out portions mounted so as to extend within the space which is cut out in the mask, and means for locating work provided on said transparent member.

4. In combination with the die block of a shoe ornamenting device, a transparent member having cut-out portions for allowing ornamenting dies to pass therethrough, and edges of said cutout portions shaped to act as a gauge in the positioning of work in said device.

5. In a shoe ornamenting device the combination of a die block having ornamenting dies mounted thereon, said block being so shaped and supported as to allow partially assembled shoe parts to be draped thereabout and operated on, and transparent means associated with said block and adapted to overlie shoe parts draped on said block for assisting in the positioning of said shoe parts with reference to said ornamenting dies.

6. In a shoe ornamenting device the combination of a block having a die extending therefrom, work holding means associated with said block having flexible transparent portions through which that portion of the work to be operated on may be observed and gauged and at the same time held down, said portions being composed of cellulose like material having a non-dulling action of said ornamenting die.

7. In combination, a die block for a shoe ornamenting device, flexible transparent means for positioning work having cut-out portions, the edges of which provide means for gauging and positioning work, said flexible transparent means being mounted for movement relative to said ornamenting device.

8. A shoe ornamenting device comprising a die support, an ornamenting die mounted thereon, a mask mounted for movement independently of said die and into juxtaposition with work to be ornamented, said mask having cut out portions to permit the passage of said die therethrough, and said mask being composed of transparent material, like celluloid, having portions providing means for indicating the proper position of work to be ornamented relative to said die.

9. In combination with a shoe ornamenting device having a die support with an ornamenting die mounted thereon, a mask mounted for movement independently of said die and into juxtaposition with work to be ornamented, said mask having cut out portions to permit the passage of said die therethrough, and said mask being composed of transparent material, like celluloid, having portions providing means for indicating the proper position of work to be ornamented relative to said die.

BENJAMIN W. FREEMAN.